(12) United States Patent
Jin et al.

(10) Patent No.: US 10,407,538 B2
(45) Date of Patent: Sep. 10, 2019

(54) LOW CHROMATIC ABERRATION POLYESTER DIFFERENT-SHRINKAGE COMPOSITE YARN

(71) Applicant: JIANGSU HENGLI CHEMICAL FIBRE CO., LTD., Suzhou (CN)

(72) Inventors: Guanfan Jin, Suzhou (CN); Yiwei Shao, Suzhou (CN); Ye Zhang, Suzhou (CN); Lijun Wang, Suzhou (CN); Huaizhi Zhuo, Suzhou (CN); Zhujun Ding, Suzhou (CN)

(73) Assignee: JIANGSU HENGLI CHEMICAL FIBRE CO., LTD., Suzhou (CN)

( * ) Notice: Subject to any disclaimer, the term of this patent is extended or adjusted under 35 U.S.C. 154(b) by 0 days.

(21) Appl. No.: 15/744,869

(22) PCT Filed: Oct. 25, 2016

(86) PCT No.: PCT/CN2016/103175
§ 371 (c)(1),
(2) Date: Jan. 15, 2018

(87) PCT Pub. No.: WO2017/113954
PCT Pub. Date: Jul. 6, 2017

(65) Prior Publication Data
US 2018/0208714 A1 Jul. 26, 2018

(30) Foreign Application Priority Data
Dec. 29, 2015 (CN) .......................... 2015 1 1017991

(51) Int. Cl.
| | | |
|---|---|---|
| C08G 63/183 | (2006.01) | |
| C08G 63/86 | (2006.01) | |
| D01F 1/10 | (2006.01) | |
| D01F 6/92 | (2006.01) | |
| C08G 63/83 | (2006.01) | |
| D02G 1/18 | (2006.01) | |
| D01F 6/62 | (2006.01) | |
| C25B 3/12 | (2006.01) | |
| D01D 5/08 | (2006.01) | |
| D06P 1/16 | (2006.01) | |

(52) U.S. Cl.
CPC .......... *C08G 63/183* (2013.01); *C08G 63/83* (2013.01); *C08G 63/86* (2013.01); *C08G 63/866* (2013.01); *C25B 3/12* (2013.01); *D01F 1/10* (2013.01); *D01F 6/62* (2013.01); *D01F 6/92* (2013.01); *D02G 1/18* (2013.01); *D01D 5/08* (2013.01); *D06P 1/16* (2013.01)

(58) Field of Classification Search
CPC .... C08G 63/183; C08G 63/866; C08G 63/83; C08G 63/86; D01F 6/92; D01F 1/10; D01D 5/08; D06P 1/16; Y10T 428/2924
USPC ........................................................ 428/370
See application file for complete search history.

(56) References Cited

FOREIGN PATENT DOCUMENTS

| | | | |
|---|---|---|---|
| CN | 1594660 A | | 3/2005 |
| CN | 103526323 A | | 1/2014 |
| CN | 104878487 A | * | 9/2015 |
| CN | 104878487 A | | 9/2015 |
| CN | 105506774 A | | 4/2016 |
| CN | 105603563 A | * | 5/2016 |
| JP | 2001055639 A | | 2/2001 |

* cited by examiner

*Primary Examiner* — Jennifer A Chriss
*Assistant Examiner* — Rebecca Janssen
(74) *Attorney, Agent, or Firm* — Gokalp Bayramoglu

(57) ABSTRACT

A low chromatic aberration polyester different-shrinkage composite yarn is made of polyester POY yarn and polyester FDY composite yarn. The polyester POY yarn and polyester FDY yarn is obtained by spinning the polyester solution, the rupture strength of the low color polyester different-shrinkage composite yarn is ≥1.9 cN/dtex, the elongation at break is 30.0±5.0%, the crimp shrinkage is 2.50±3.0%, the network degree is 20±5/m, the color difference ΔE is less than 0.200. In the invention, the magnesium ethylene glycol is relatively mild, the thermal degradation coefficient is small, the oligomers in the polymerization process is reduced, and the oligomers in the dissolution process are further reduced, so that the appearance of stains and streaks reduces during the dyeing and post-processing heat setting of the polyester fiber, which ensures the fiber's leveling and rubbing fastness.

3 Claims, No Drawings

LOW CHROMATIC ABERRATION POLYESTER DIFFERENT-SHRINKAGE COMPOSITE YARN

CROSS-REFERENCE TO RELATED APPLICATIONS

This application is the national stage entry of International Application No. PCT/CN2016/103175, filed on Oct. 25, 2016, which claims the benefit of priority from Chinese Patent Application No. CN201511017991.5, filed on Dec. 29, 2015, the entire contents of which are incorporated herein by reference.

TECHNICAL FIELD

The invention discloses the technical field of polyester preparation, relates to a low chromatic aberration polyester different-shrinkage composite yarn and a preparation method thereof. Especially the type of yarn applies a polycondensation catalyst which adopts a mixture of magnesium ethylene glycol and antimony ethylene glycol and the polyester chips which are brewed and washed through water and solvent agent under the condition of 120-130° C. and 0.2-0.3 MPa.

BACKGROUND

Polyethylene terephthalate (PET) is a kind of polymer with excellent performance. PET is preferred for its high modulus, high strength, crispness, good shape retention, pure hygiene and good barrier property. Thus, it is widely used in fiber, bottle packaging, film and sheet and other fields. The output increases year by year, and the status of the industry is significantly improved.

PET is a symmetrical linear macromolecule, the molecular chain does not contain side chain groups, regularity is very good, this structure has a high glass transition temperature, so it needs to dye at high temperatures, in order to promote the dye molecules to the fiber interior the proliferation. In addition. PET molecular chain regular, good crystallinity, molecular chains arranged closely, and the molecular chain does not have molecules polar groups to react with dye molecules, so that it is more difficult to color polyester fiber. Because of its lack of hydrophilic groups in the molecule, its hygroscopicity is poor, which results difficulties in dying dacron. Polyester disperse dyeing mainly uses high-temperature high-pressure dyeing method.

Oligomers in polyester fibers are low molecular weight esters or ethers that primarily refers to oligomers with a degree of polymerization of less than 10. Diethylene glycol is produced as a by-product. Among them, oligomers are divided into linear oligomers and cyclic oligomers, of which cyclic polymers, especially cyclic trimers are the main part. Oligomers are mainly involved in heterogeneous nucleation, spinning processing, dyeing and the like. Polyester performance and after processing are adversely affected by oligomer. Ethylene terephthalate polymers (PET) contain about 3-4% of oligomers, and the presence of oligomers on the fiber surface can cause problems with dyeing and finishing. Diffusion of oligomers is most likely to occur during temperature control and incubation of the dye. When cooling, the same as the dye, the solubility of the oligomer in water decreases drastically with decreasing temperature and thus crystallizes out. The precipitated dye and oligomer adhere to the surface of the fiber and are very difficult to wash off, bringing a lot of trouble to dyeing and finishing. During dyeing process, the accumulation of dyes and oligomers adhered to the fiber surface, causing dye color spots, stains, color flowers and so on. Deposition in the dyeing machine pipes and valves, impede the flow of liquid, resulting in dyeing difficulties. The key to elimination of the oligomers is to eliminate the oligomer cyclic trimer and diethylene glycol, on the one hand to reduce oligomer production during the polymerization and on the other hand to remove them before or during dyeing.

Hetero-shrinking composite yarn is a kind of filament with different potential shrinkage properties, that is, high-shrinkage partially oriented yarn (POY) and low-shrinkage fully drawn yarn (FDY) are mixed fiber. The main features of PET different-shrinkage composite yarn are high bulkiness and softness. The appearance of PET different shrinkage composite silk is similar to ordinary filaments. Filaments with different potential shrinkage properties, that is, composite yarns composed of high-shrinkage POY and low-shrinkage FDY, are produced by mixed fiber processing. The shrinkage of the two components causes different shrinkage.

SUMMARY

The purpose of the invention is to provide a low chromatic aberration polyester different-shrinkage composite yarn and a preparation method thereof, which includes a polyester made by polycondensation under the catalysis of a mixture of magnesium ethylene glycol and antimony ethylene glycol and a type of low chromatic aberration polyester different-shrinkage composite yarn and its preparation method. In the invention, a mixture of magnesium ethylene glycol and antimony ethylene glycol is used as a polycondensation catalyst, and thermal degradation is reduced to minimum. The polyester chips are brewed and washed at 130° C. and 0.3 MPa with water and a rinsing agent, in order to relieve the effect of oligomer and diethylene glycol Content on dyeing of polyester composite yarn.

The low chromatic aberration polyester different-shrinkage composite yarn of the present invention is obtained by polycondensation of polyester with terephthalic acid and ethylene glycol by esterification and catalysis by a mixture of magnesium ethylene glycol and antimony ethylene glycol. After that, it will have granulation and spinning after rinsing process. The low chromatic aberration polyester different-shrinkage composite yarn is compounded by polyester POY yarn and polyester FDY yarn. The polyester POY yarn and polyester FDY yarn is obtained via polyester After being washed and spun. The low chromatic aberration polyester different-shrinkage composite yarn has a breaking strength ≥0.9 cN/dtex, an elongation at break of 30.0±5.0%, a curling shrinkage of 2.50±3.0% and a network degree of 20±5/m, color difference ΔE less than 0.200.

In the chip of industrial polyester, the mass percentage of oligomer is less than 0.5% and the content of diethylene glycol is less than 0.5%.

The molecular formula of magnesium ethylene glycol is $Mg(OCH_2CH_2OH)_2$.

The rinsing refers to that the granulated slices are brewed and washed with water and a rinsing agent at 120-130° C. and 0.2-0.3 MPa.

Polyester fiber dyeing and post-processing, the factors of surface oligomers' precipitation vary, mainly temperature and time and other factors. Increasing the dyeing temperature will exacerbate the migration of oligomers, especially when certain auxiliaries or dyes are present. The longer the liquid cycle continues, the more the amount of the oligomer migrates from the inside of the fiber increases. The frequent cold/heat cycles and the presence of auxiliaries and dyes can greatly exacerbate the oligomerization and deposition. At the same time, the heat setting temperature and time have a great influence on the migration speed and migration of oligomers. Heatsetting of synthetic fibers for dyeing and finishing is an extremely important process. The main objective is to eliminate the existing wrinkles on the fabric and to increase the dimensional stability of the fabric as well as to improve the strength, feel, pilling, surface smoothness and so on. However, it is often the case during the setting of a color fabric that stains and streaks tend to appear on the surface of the fabric after heat setting, and the levelness and rubbing fastness are also significantly decreased, especially for ultra-fine polyester fabrics. The migration of oligomers from the inside to the outside under heat is one of the main causes. Existing technologies are concentrated in solving the dyeing effect of the oligomers in the dyeing process. However, this is only a palliative method. The truly effective way is to find the reason.

The use of magnesium ethylene glycol and antimony ethylene glycol mixture as a polycondensation catalyst. Magnesium ethylene glycol is a relatively mild category, the thermal degradation coefficient is small. Fewer side reactions are caused during the reaction, which reduces the production of oligomer during the reaction. The main factors causing thermal degradation are high temperature and the catalyst. High temperature is because that the reaction strength is too high, which leads to accelerated degradation, resulting in carboxyl end groups, but also to increase the cyclic oligomer. Catalyst is related to catalyst degradation reaction constant. In the polycondensation process, the role of the catalyst is not only to catalyze the formation of the main reaction, affecting the rate and yield of the reaction, but also to catalyze thermal degradation and ether bond formation, increasing cyclic oligomers and diethylene glycol content.

A low chromatic aberration polyester different-shrinkage composite yarn has a linear density deviation of ±2.5%, CV value of elongation at break of not more than 10.0%, CV value of coefficient variation of not more than 10.0% and oil content of 1.0±0.2%, fiber number of 100-150 dtex.

As mentioned above, a low chromatic aberration polyester different-shrinkage composite yarn, wherein the mass ratio of magnesium ethylene glycol to antimony ethylene glycol is 2:1 to 3:1 in the mixture of magnesium ethylene glycol and antimony ethylene glycol.

The present invention also provides a method for preparing a low chromatic aberration polyester different-shrinkage composite yarn, comprising the steps of esterifying terephthalic acid and ethylene glycol, polycondensation under the catalysis of magnesium and antimony ethylene glycol compound, and then granulation to obtain polyester chips, and then the polyester chips are washed after the polyester obtained. Polyester is used in spinning by applying POY process and FDY process, and then plied and wired. After the network compound, the final step is winding formation of different shrinkage composite silk.

The main process is:
1. Preparation of Catalyst Magnesium Ethylene Glycol:
Ethylene glycol is added in the single-compartment electrolyzing cell, the supporting electrolyte is magnesium chloride, the metal magnesium block is anodes and the cathode is graphite. The direct current is 6-1V, the cathode current density is 150-200 mA, the temperature is 50-60° C., for 10 to 12 hours, remove the electrode after electrolysis, obtain white suspension. Filtered under reduced pressure, the white solid is washed with anhydrous ethanol, and is dried to get magnesium ethylene glycol.

2. Preparation of Polyester, Including Esterification and Polycondensation:

The Esterification Reaction:

Using terephthalic acid and ethylene glycol as raw materials, adding the polyether inhibitor agent, and preparing the uniform slurry for esterification to obtain the esterified product. The esterification reaction is pressurized in a nitrogen atmosphere and the pressure is controlled at atmospheric pressure to 0.3 MPa, the temperature is 250 to 260° C. When esterification water distillate amount is more than 90% of the theoretical value, the esterification reaction ends.

The Polycondensation Reaction:

Including polycondensation reaction of low vacuum phase and high vacuum phase:

In the polycondensation reaction low-vacuum stage, adding the catalyst and the stabilizer into the esterified product, and initiating the polycondensation reaction under the condition of negative pressure. The pressure of the stage is steadily pumped down from the normal pressure to the absolute pressure of 500 Pa and the temperature is controlled at 260 to 270° C. The reaction time is 30 to 50 minutes. The catalyst is a mixture of magnesium ethylene glycol and antimony ethylene glycol.

The polycondensation reaction in high vacuum stage, after the low vacuum phase of the polycondensation reaction, vacuuming is continued. The reaction pressure is reduced to an absolute pressure of less than 100 Pa, the reaction temperature is controlled at 275-280° C. and the reaction time is 50-90 minutes.

Obtained polyester is granulated to obtain polyester chips.

3. Solvent Cleaning

The polyester chip is scoured by water and a rinsing agent at 120-130° C. and 0.2-0.3 MPa for 3-5 hours and then washed to obtain a polyester.

4. Main Parameters of Spinning:
Spinning temperature: 280 to 300° C.,
Air temperature: 20 to 22° C.,
Joint stock network pressure: 3.5 to 4.5 bar,
GR1 speed: 800 to 1000 m/min,
SR1 speed: 3000 to 4200 m/min,
GR2 speed: 3000 to 4000 m/min,
HT1 temperature: 90 to 115° C.,
HT2 temperature: 130 to 140° C.,
Winding speed: 3000 to 4000 m/min.

As described above, a method for preparing a low chromatic aberration polyester different-shrinkage composite yarn, wherein the mole ratio of the ethylene glycol to the terephthalic acid is 1.2:1 to 2.0:1.

As described above, a method for preparing a low chromatic aberration polyester different-shrinkage composite yarn, the mass ratio of magnesium ethylene glycol and antimony ethylene glycol in the mixture of magnesium ethylene glycol and antimony ethylene glycol is 2:1 to 3:1. The amount of the catalyst is 0.01% to 0.05% of the quality of the terephthalic acid.

As described above, a method for preparing a low chromatic aberration polyester different-shrinkage composite yarn, the stabilizer is selected from one of triphenyl phosphate, trimethyl phosphate and trimethyl phosphite, the amount of stabilizer is the terephthalic acid 0.01% to 0.05% by weight. Stabilizers mainly is phosphate ester, whose main role is to capture the reaction generated during the polymerization of free radicals, reduce side effects.

As described above, the preparation method of a low chromatic aberration polyester different-shrinkage composite yarn, the mass ratio of the water and the rinse agent is 100:4 to 100:3, the ratio of the polyester chips to water and the rinse agent, that is, the solid liquid ratio is 1:10 to 1:5. The rinsing agent is one of ethylene glycol monoethyl ether, ethylene glycol monopropyl ether and ethylene glycol monobutyl ether. Add a small amount of rinsing agent that is soluble in water and also dissolve most of the low molecular ether and ester, which is helpful to improve the washing effect and oligomer reduction.

As described above, a low-chromatic aberration polyester shrinkwrap composite silk preparation method, said washing means after boiling the polyester chips with 70 to 80° C. hot water wash 10 to 15 min, then washed with cold water, dried and cooled standby.

As described above, a method for preparing a low-chromatic aberration polyester shrinkage composite silk, the polyether inhibitor agent is one of sodium acetate and calcium acetate, the amount of polyether inhibitor agent is 0.01% 0.05%. The polyether inhibitor agent reduces the formation of ether under acidic conditions by adding a small amount of NaAc, thereby reducing the reaction of ethylene glycol to diethylene glycol.

It is an object of the present invention to provide a low-chromatic aberration polyester heterocomposite composite yarn that uses a more mild type of polycondensation catalyst, magnesium ethylene glycol, with less side reaction induced during the reaction and less heat during the processing Degradation, reducing the production of oligomers in the process. Polyester chips were brewed at 130° C. and 0.3 MPa with water and detergent, which improved the washing effect and oligomer reduction. The reduction of oligomers will reduce the migration of oligomers from the inside to the outside in the dyeing and post-processing heat-setting of polyester fibers, reduce the appearance of speckles and streaks, and ensure the fiber leveling and rubbing fastness.

Benefit:
Using magnesium ethylene glycol and antimony ethylene glycol mixture as a polycondensation catalyst, magnesium ethylene glycol is a relatively mild category, the thermal degradation coefficient is small, less side reactions in the reaction process, reducing the processing Mid-terminal carboxyl and oligomer production.
Polyester chips oligomers content of less than 0.5% by mass, diethylene glycol mass percentage content of less than 0.5%0, help to further improve the quality of the fibers.
Polyester chips can be washed with water and the detergent at 120 to 130° C. and 0.2 to 0.3 MPa to improve the washing effect and reduce the oligomer.
Polyether inhibitor agent reduces the formation of ether under acidic conditions by adding a small amount of NaAc, thus reducing the activity of ethylene glycol to diethylene glycol.
Oligomer decreases during the polymerization process, oligomers in the washing process to further reduce, making the polyester fiber dyeing and post-processing heat setting, the amount of oligomer migration from the fiber inside outwards to reduce the stains and stripes Flowers appear to ensure that the fiber leveling and rubbing fastness.
The shrink-wrapped composite yarn of the present invention has excellent shading performance, excellent dyeing performance, high loft and soft hand feel, and also eliminates the auroral defects of the chemical fiber due to the large number of wire loops on the surface of the fiber.

DETAILED DESCRIPTION

Hereinafter, the present invention will be described in more detail by the following examples, but not limited thereto.

The process for preparing the low-chromatic aberration polyester shrink-wrapped composite yarn according to the invention is that the polyesters are respectively spun by applying the POY process and the FDY process, then plied and combined, and then subjected to network compaction and finally wound to form isocomplexed composite strands.

1. Dye:
   Disperse Brilliant Blue 2BLN, 5% (o.w.f)
2. Dyeing Process:
   The fibers are incubated at 70-80° C. for 10-15 min, and the heating rate is 1.0-2.0° C./min, the temperature is maintained at 120-130° C. for 40-60 min, the temperature is reduced, and the samples are reduced and washed at 70-80° C. for 20-30 min.
3. The Percentage of Dye Determination
   According to the above process for dyeing, and were dyed dye solution, the residual solution of 2 ml in 10 ml volumetric flask, add acetone 4 ml, the dye fully dissolved. Diluted with distilled water to the mark, and then measured λmax spectrophotometer, when the dye absorbance A0, A1 is:

Dyeing percentage (%)=(1a$A1/A0$)×100%

Where: A0 - - - dye solution before absorbance
   A1 - - - Residue absorbance
4. Determination of Color Fastness
   Press GB3920-83, GB251-64, GB3921-83 test
5. Color Yield and Color Measurement
   Color measurement using colorimeter test.
6. The Determination of Apparent Color Depth (K/S)
   The Kubelka-munk function is used in the formula: $K/S=(1-R)2//2R$ where K is the absorption coefficient of the measured object, S is the scattering coefficient of the measured object, R is the measured object when the infinite thickness of the reflectivity. Apply the SF600X Datacolor colorimetric colorimeter test, each sample tested in different regions 5 times, whichever is the mathematical average.

EXAMPLE 1 a low chromatic aberration polyester different-shrinkage composite yarn, wherein the main process is:
1. Preparation of Catalyst Magnesium Glycol:
   Add ethylene glycol into the single-compartment electrolytic cell, magnesium chloride is electrolyte, the anode is magnesium, the cathode is graphite. Under DC, the initial voltage is 6V, the cathode current density is 150 mA, and electrolysis is carried out for 10 hours at 50° C. Remove the electrode after the electrolysis, we can get white suspension. Filter it under reduced pressure, wash the white solid with anhydrous ethanol, and we get magnesium ethylene glycol.
2. Preparation of Polyester, Including Esterification and Polycondensation:
   Esterification Reaction:
   Using terephthalic acid and ethylene glycol as raw materials, ethylene glycol and terephthalic acid molar ratio of 1.2:1, adding polyether-inhibitor sodium acetate, sodium acetate dosage of terephthalic acid in an amount of 0.01% by weight. Start esterification reaction under nitrogen atmosphere pressure, and control the pressure at atmospheric pressure, the temperature at 250° C. When esterified water distillate amount reaches 91% of the theoretical value of the esterification, reaction ends.

Polycondensation Reaction:

Including polycondensation reaction of low vacuum phase and polycondensation reaction high vacuum phase:

In the polycondensation reaction low-vacuum stage, add catalyst and the stabilizer acid triphenyl ester into the esterification product. The acid triphenyl ester dosage is 0.01% of terephthalic acid by weight, and the amount of catalyst is 0.01% of terephthalic acid by mass. The polycondensation reaction is started under the condition of negative pressure, the pressure is steadily pumped from the atmospheric pressure to the absolute pressure of 498 Pa, the temperature is controlled at 260° C., and the reaction time is 30 minutes. The catalyst is a mixture of magnesium ethylene glycol and antimony ethylene glycol, in which magnesium glycol and antimony ethylene glycol mass ratio is 2:1;

After the polycondensation reaction in the low-vacuum stage, the vacuum is continued to reduce the reaction pressure to 98 Pa, the reaction temperature is controlled at 275° C., and the reaction time is 50 minutes. The polyester sections are obtained by granulation.

3. Solvent Cleaning

Polyester sections are washed with water and rinsing agengt ethylene glycol monoethyl ether at 120° C. and 0.2 MPa for 3 hours. After washing, the polyester sections are washed with hot water at 70° C. for 10 minutes and then washed with cold water. After drying and cooling, the mass ratio of water to the rinsing agengt is 100:3, the ratio of the polyester slice to the water and the rinsing agengt, that is, the solid to liquid ratio is 1:5.

4. The Main Process Parameters of Spinning:

Spinning temperature: 280° C.,
Air temperature: 20° C.,
Joint stock network pressure: 3.5 bar,
GR1 speed: 800 m/min,
SR1 speed: 3000 m/min,
GR2 speed: 3000 m/min,
HT1 temperature: 90° C.,
HT2 temperature: 130° C.,
Winding speed: 3000 m/min.

The prepared low shrinkage polyester heterocomplex composite yarn has a breaking strength of 1.9 cN/dtex, and breaking extension is 35%, the crimp shrinkage is 5.5%, the network degree is 24/m, the linear density deviation rate is +2.5%, CV value of breaking extension is 9.8%, CV coefficient of variation is 9.8%, oil content is 1.2%, fineness: 100 dtex.

5. Dyeing

| Sample | Dyeing rate % | K/S value | chromatic aberration ΔE |
|---|---|---|---|
| Common products | 81.8 | 20.76 | 0.633 |
| Low-chromatic aberration products | 89.1 | 22.78 | 0.125 |

| | Soaping fastness | | | |
|---|---|---|---|---|
| Sample | Polyester staining | Cotton staining | Dry friction | Wet friction |
| Common products | 4 | 4 | 4 | 3 |
| Low-chromatic aberration products | 5 | 5 | 5 | 4 |

EXAMPLE 2 a low chromatic aberration polyester different-shrinkage composite yarn, wherein the main process is:

1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 10V, the cathode current density is 200 mA, and electrolysis is carried out for 12 hours at 60° C. Remove the electrode after the electrolysis, we can get white suspension. Filter it under reduced pressure, wash the white solid with anhydrous ethanol, and we get magnesium ethylene glycol.

2. Preparation of Polyester, Including Esterification and Polycondensation:

Esterification Reaction:

Using terephthalic acid and ethylene glycol as raw materials, ethylene glycol and terephthalic acid molar ratio of 2.0:1, adding polyether-inhibitor calcium acetate, calcium acetate dosage of terephthalic acid in an amount of 0.05% by weight. Start esterification reaction under nitrogen atmosphere pressure, and control the pressure at 0.3 MPa, the temperature at 260° C. When esterified water distillate amount reaches 92% of the theoretical value of the esterification, reaction ends.

Polycondensation Reaction:

Including Polycondensation Reaction of Low Vacuum Phase and Polycondensation Reaction High Vacuum Phase:

In the polycondensation reaction low-vacuum stage, add catalyst and the stabilizer trimethyl phosphate into the esterification product. The trimethyl phosphate dosage is 0.05% of terephthalic acid by weight, and the amount of catalyst is 0.05% of terephthalic acid by mass. The polycondensation reaction is started under the condition of negative pressure, the pressure is steadily pumped from the atmospheric pressure to the absolute pressure of 496 Pa, the temperature is controlled at 270° C., and the reaction time is 40 minutes. The catalyst is a mixture of magnesium ethylene glycol and antimony ethylene glycol, in which magnesium glycol and antimony ethylene glycol mass ratio is 3:1:

After the polycondensation reaction in the low-vacuum stage, the vacuum is continued to reduce the reaction pressure to 95 Pa, the reaction temperature is controlled at 280° C., and the reaction time is 90 minutes. The polyester sections are obtained by granulation.

3. Solvent Cleaning

Polyester sections are washed with water and rinsing agengt ethylene glycol monopropyl ether at 130° C. and 0.3 MPa for 5 hours. After washing, the polyester sections are washed with hot water at 80° C. for 15 minutes and then washed with cold water. After drying and cooling, the mass ratio of water to the rinsing agengt is 100:4, the ratio of the polyester slice to the water and the rinsing agengt, that is, the solid to liquid ratio is 1:10;

4. The Main Process Parameters of Spinning:

Spinning temperature: 300° C.,
Air temperature: 22° C.
Joint stock network pressure: 4.5 bar,
GR1 speed: 1000 m/min,
SR1 speed: 4200 m/min,
GR2 speed: 4000 m/min,
HT1 temperature: 115° C.,
HT2 temperature: 140° C.,
Winding speed: 4000 m/min.

The prepared low shrinkage polyester heterocomplex composite yarn has a breaking strength of 1.9 cN/dtex, and breaking extension is 25.0%, the crimp shrinkage is −0.5%, the network degree is 15/m, the linear density deviation rate is −2.5%, CV value of breaking extension is 8.9%, CV coefficient of variation is 9.7%, oil content is 0.8%, fineness: 105 dtex.

5. Dyeing

| Sample | Dyeing rate % | K/S value | chromatic aberration ΔE |
|---|---|---|---|
| Common products | 81.8 | 20.76 | 0.633 |
| Low-chromatic aberration products | 93.1 | 25.75 | 0.143 |

| | Soaping fastness | | | |
|---|---|---|---|---|
| Sample | Polyester staining | Cotton staining | Dry friction | Wet friction |
| Common products | 4 | 4 | 4 | 3 |
| Low-chromatic aberration products | 5 | 5 | 5 | 5 |

EXAMPLE 3 a low chromatic aberration polyester different-shrinkage composite yarn, wherein the main process is:

1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 7V, the cathode current density is 160 mA, and electrolysis is carried out for 11 hours at 55° C. Remove the electrode after the electrolysis, we can get white suspension. Filter it under reduced pressure, wash the white solid with anhydrous ethanol, and we get magnesium ethylene glycol.

2. Preparation of Polyester. Including Esterification and Polycondensation:

Esterification Reaction:

Using terephthalic acid and ethylene glycol as raw materials, ethylene glycol and terephthalic acid molar ratio of 1.5:1, adding polyether-inhibitor calcium acetate, calcium acetate dosage of terephthalic acid in an amount of 0.02% by weight. Start esterification reaction under nitrogen atmosphere pressure, and control the pressure at 0.2 MPa, the temperature at 255° C. When esterified water distillate amount reaches 92% of the theoretical value of the esterification, reaction ends.

Polycondensation Reaction:

Including Polycondensation Reaction of Low Vacuum Phase and Polycondensation Reaction High Vacuum Phase:

In the polycondensation reaction low-vacuum stage, add catalyst and the stabilizer trimethyl phosphate into the esterification product. The trimethyl phosphate dosage is 0.02% of terephthalic acid by weight, and the amount of catalyst is 0.02% of terephthalic acid by mass. The polycondensation reaction is started under the condition of negative pressure, the pressure is steadily pumped from the atmospheric pressure to the absolute pressure of 496 Pa, the temperature is controlled at 265° C., and the reaction time is 35 minutes. The catalyst is a mixture of magnesium ethylene glycol and antimony ethylene glycol, in which magnesium glycol and antimony ethylene glycol mass ratio is 3:1.

After the polycondensation reaction in the low-vacuum stage, the vacuum is continued to reduce the reaction pressure to 98 Pa, the reaction temperature is controlled at 277° C., and the reaction time is 60 minutes. The polyester sections are obtained by granulation.

3. Solvent Cleaning

Polyester sections are washed with water and rinsing agengt ethylene glycol monopropyl ether at 125° C. and 0.2 MPa for 3 hours. After washing, the polyester sections are washed with hot water at 70° C. for 15 minutes and then washed with cold water. After drying and cooling, the mass ratio of water to the rinsing agengt is 100:4, the ratio of the polyester slice to the water and the rinsing agengt, that is, the solid to liquid ratio is 1:10;

4. The Main Process Parameters of Spinning:

Spinning temperature: 290° C.,
Air temperature: 21° C.,
Joint stock network pressure: 3.8 bar,
GR1 speed: 900 m/min,
SR1 speed: 3500 m/min,
GR2 speed: 3500 m/min,
HT1 temperature: 100° C.,
HT2 temperature: 135° C.,
Winding speed: 3200 m/min.

The prepared low shrinkage polyester heterocomplex composite yarn has a breaking strength of 2.3 cN/dtex, and breaking extension is 26.0%, the crimp shrinkage is 4.5%, the network degree is 16/m, the linear density deviation rate is −2.5%, CV value of breaking extension is 9.1%, CV coefficient of variation is 9.9%, oil content is 0.9%, fineness: 132 dtex.

5. Dyeing

| Sample | Dyeing rate % | K/S value | chromatic aberration ΔE |
|---|---|---|---|
| Common products | 81.8 | 20.76 | 0.633 |
| Low-chromatic aberration products | 92.2 | 22.87 | 0.137 |

| | Soaping fastness | | | |
|---|---|---|---|---|
| Sample | Polyester staining | Cotton staining | Dry friction | Wet friction |
| Common products | 4 | 4 | 4 | 3 |
| Low-chromatic aberration products | 5 | 5 | 5 | 5 |

EXAMPLE 4 a low chromatic aberration polyester different-shrinkage composite yarn, wherein the main process is:

1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 7V, the cathode current density is 170 mA, and electrolysis is carried out for 11 hours at 58° C. Remove the electrode after the electrolysis, we can get white suspension. Filter it under reduced pressure, wash the white solid with anhydrous ethanol, and we get magnesium ethylene glycol.

2. Preparation of Polyester, Including Esterification and Polycondensation:

Esterification Reaction:

Using terephthalic acid and ethylene glycol as raw materials, ethylene glycol and terephthalic acid molar ratio of 1.8:1, adding polyether-inhibitor calcium acetate, calcium acetate dosage of terephthalic acid in an amount of 0.02% by weight. Start esterification reaction under nitrogen atmosphere pressure, and control the pressure at 0.3 MPa, the temperature at 250° C. When esterified water distillate amount reaches 98% of the theoretical value of the esterification, reaction ends.

Polycondensation Reaction:

Including Polycondensation Reaction of Low Vacuum Phase and Polycondensation Reaction High Vacuum Phase:

In the polycondensation reaction low-vacuum stage, add catalyst and the stabilizer trimethyl phosphate into the esterification product. The trimethyl phosphate dosage is 0.02% of terephthalic acid by weight, and the amount of catalyst is 0.02% of terephthalic acid by mass. The polycondensation reaction is started under the condition of negative pressure, the pressure is steadily pumped from the atmospheric pressure to the absolute pressure of 496 Pa, the temperature is controlled at 264° C., and the reaction time is 38 minutes. The catalyst is a mixture of magnesium ethylene glycol and antimony ethylene glycol, in which magnesium glycol and antimony ethylene glycol mass ratio is 3:1;

After the polycondensation reaction in the low-vacuum stage, the vacuum is continued to reduce the reaction pressure to 99 Pa, the reaction temperature is controlled at 280° C., and the reaction time is 90 minutes. The polyester sections are obtained by granulation.

3. Solvent Cleaning

Polyester sections are washed with water and rinsing agengt ethylene glycol monopropyl ether at 120° C. and 0.3 MPa for 3 hours. After washing, the polyester sections are washed with hot water at 70° C. for 15 minutes and then washed with cold water. After drying and cooling, the mass ratio of water to the rinsing agengt is 100:4, the ratio of the polyester slice to the water and the rinsing agengt, that is, the solid to liquid ratio is 1:8.

4. The Main Process Parameters of Spinning:

Spinning temperature: 280° C.,
Air temperature: 20° C.,
Joint stock network pressure: 4.5 bar,
GR1 speed: 1000 m/min,
SR1 speed: 3000 m/mm,
GR2 speed: 3000 m/min,
HT1 temperature: 90° C.,
HT2 temperature: 140° C.,
Winding speed: 3000 m/min.

The prepared low shrinkage polyester heterocomplex composite yarn has a breaking strength of 2.3 cN/dtex, and breaking extension is 26.0%, the crimp shrinkage is 5.5%, the network degree is 15/m, the linear density deviation rate is −2.5%, CV value of breaking extension is 9.2%, CV coefficient of variation is 9.3%, oil content is 0.8%, fineness: 150 dtex.

5. Dyeing

| Sample | Dyeing rate % | K/S value | chromatic aberration ΔE |
|---|---|---|---|
| Common products | 81.8 | 20.76 | 0.633 |
| Low-chromatic aberration products | 92.8 | 25.85 | 0.156 |

| | Soaping fastness | | | |
|---|---|---|---|---|
| Sample | Polyester staining | Cotton staining | Dry friction | Wet friction |
| Common products | 4 | 4 | 4 | 3 |
| Low-chromatic aberration products | 5 | 5 | 5 | 5 |

What is claimed is:

1. A low chromatic aberration polyester different-shrinkage composite yarn comprising a composite of polyester partially oriented yarn (POY) yarn and polyester fully drawn yarn (FDY) yarn;
   wherein the polyester POY yarn and the polyester FDY yarn are obtained by spinning after dissolving the polyester; wherein a breaking strength of the low chromatic aberration polyester different-shrinkage composite yarn is greater than or equal to 1.9 cN/dtex, a breaking elongation is 30.0±5.0% and a curling shrinkage is 2.50±3.0%, a network degree is 20±5/m, a color difference ΔE is less than 0.200, wherein the polyester is made from an esterification of terephthalic acid and ethylene glycol and a polycondensation under the catalysis of a mixture of magnesium ethylene glycol and antimony ethylene glycol, and granulation to obtain polyester chips;
   wherein in the polyester chips, a content of oligomer by mass is less than 0.5% and a content of diethylene glycol is less than 0.5%;
   wherein the molecular formula of magnesium ethylene glycol is $Mg(OCH_2CH_2OH)_2$;
   wherein the granulated polyester chips are brewed and washed with water and a rinsing agent at 120-130° C. and 0.2-0.3 MPa.

2. The low chromatic aberration polyester different-shrinkage composite yarn according to claim 1, wherein the low chromatic aberration polyester different-shrinkage composite yarn has a linear density deviation of ±2.5%, an elongation at break CV value is ≤10.0%, coefficient of variation CV value is ≤10.0%, an oil content of 1.0±0.2%, and a fineness of 100-150 dtex.

3. The low chromatic aberration polyester different-shrinkage composite yarn according to claim 1, wherein the mixture of magnesium ethylene glycol and antimony ethylene glycol has magnesium ethylene glycol and antimony ethylene glycol in a mass ratio of 2:1 to 3:1.

* * * * *